United States Patent [19]

Saito et al.

[11] Patent Number: 5,417,399
[45] Date of Patent: May 23, 1995

[54] APPARATUS FOR SUPPORTING ARTICLE IN HEATING FURNACE

[75] Inventors: Tatsuo Saito; Kohei Kobayashi; Kouji Takata; Yuichi Ohga; Hikaru Sato, all of Yokohama, Japan

[73] Assignee: Sumitomo Electric Industries, Ltd., Osaka, Japan

[21] Appl. No.: 308,959

[22] Filed: Sep. 20, 1994

Related U.S. Application Data

[63] Continuation of Ser. No. 103,763, Aug. 10, 1993, abandoned, which is a continuation-in-part of Ser. No. 894,343, Jun. 4, 1992, abandoned.

[30] Foreign Application Priority Data

Jun. 19, 1991 [JP] Japan .................. 3-147269
Nov. 27, 1991 [JP] Japan .................. 3-312245
May 22, 1992 [JP] Japan .................. 4-130675

[51] Int. Cl.⁶ .......................................... C03B 37/012
[52] U.S. Cl. .................................. 248/317; 403/305; 65/385
[58] Field of Search ............... 248/317, 291, 324; 403/300, 305, 306, 309, 313, 331, 353; 65/3.1, 3.11, 3.12, 11.1, 13, 260

[56] References Cited

U.S. PATENT DOCUMENTS

| 540,834 | 6/1895 | Gumm ................ | 403/305 |
|---|---|---|---|
| 721,427 | 2/1903 | Cope ................. | 403/353 |
| 883,499 | 3/1908 | Smith ................ | 403/305 |
| 2,630,303 | 3/1953 | Krucker ............. | 403/331 |
| 2,829,503 | 4/1958 | Hayes ............... | 403/305 |
| 4,347,069 | 8/1982 | Haney et al. ....... | 65/3.12 |
| 4,684,384 | 8/1987 | Berkey .............. | 65/11.1 |
| 4,960,009 | 10/1990 | Schultz et al. .... | 403/305 |

FOREIGN PATENT DOCUMENTS

| 399265 | 4/1909 | France .............. | 403/306 |
|---|---|---|---|
| 62-256735 | 11/1987 | Japan . | |
| 2160636 | 6/1990 | Japan . | |
| 312336 | 1/1991 | Japan . | |
| 3242339 | 10/1991 | Japan . | |
| 5-57216 | 8/1993 | Japan . | |

Primary Examiner—Scott A. Smith
Attorney, Agent, or Firm—Sandler, Greenblum & Bernstein

[57] ABSTRACT

In an apparatus for suspending from a quartz rotary shaft, a glass article to be heat treated in a heating furnace so as to support the glass article, a slot is provided for receiving a cylindrical projection formed at an upper end of the glass article, the slot has an elliptical cross section and is formed at a lower end of the rotary shaft. A pin hole for securing the glass article to the rotary shaft, which is formed on the rotary shaft along a minor axis of the slot; wherein a clearance between a peripheral surface of the slot and that of the cylindrical projection along the minor axis of the slot is set to not more than 0.2 mm, while a clearance between the peripheral surface of the slot and that of the cylindrical projection along a major axis of the slot is set to not less than 0.4 mm. An apparatus for supporting a glass article including first and second dummy rods and a coupling member is also provided. Pins extending through the respective dummy rods and coupling member secure the rods to the member.

8 Claims, 8 Drawing Sheets

APPARATUS FOR SUPPORTING ARTICLE IN HEATING FURNACE

This application is a continuation of application Ser. No. 08/103,763, filed Aug. 10, 1993, now abandoned, which is a continuation-in-part of application Ser. No. 07/894,343, filed Jun. 4, 1992, now abandoned.

BACKGROUND OF THE INVENTION

The present invention relates to an apparatus for suspending a starting member from a rotary shaft so as to support the starting member, which is used at the time of manufacture of glass preform suitable for production of an optical fiber.

For production of the optical fiber, VAD (vapor phase axial deposition) method is known. FIG. 4 shows VAD method schematically. In FIG. 4, minute glass particles 4 of $SiO_2$ formed in oxy-hydrogen flame are deposited on a quartz rod 5 mounted on a distal end of a rotating quartz bar 3 so as to make a cylindrical porous preform and the porous preform is sintered so as to produce a transparent preform of the optical fiber. The quartz bar 3 and the quartz rod 5 act as the starting member.

FIG. 1 is a longitudinal sectional view showing a connecting portion between the quartz bar 3 and a rotary shaft 1 in a prior art apparatus, while FIG. 3 is a cross-sectional view of the connecting portion in the prior art apparatus. As shown in FIGS. 1 and 3, a cylindrical projection 3a is provided at an upper end of the quartz bar 3, while a cylindrical slot 1a for receiving the cylindrical projection 3a is formed at a lower end of the rotary shaft 1. A pin hole 1c further extends through a lower end portion of the rotary shaft 1 across the cylindrical slot 1a. After the cylindrical projection 3a of the quartz bar 3 has been fitted into the cylindrical slot 1a of the rotary shaft 1, the projection 3a is coupled with the rotary shaft i by driving a pin 2 into the pin hole 1c of the rotary shaft 1 through the projection 3a. In the prior art apparatus, a clearances between a diameter of the slot 1a and a diameter of the projection 3a is set at about 0.1 mm such that run-out of the glass preform at the time of rotation of the rotary shaft 1 is eliminated.

However, since the prior art apparatus for supporting the glass preform is subjected to thermal deformation due to its long-term use or a pin hole of the projection 3a and the rotary shaft 1 is deformed by weight of the preform, it is impossible to eliminate run-out of the preform.

Meanwhile, if run-out of the preform takes place, heat applied to the porous preform in a furnace becomes nonuniform. As a result, shrinkage speed of the porous preform becomes nonuniform when the porous preform is changed to the glass preform, so that the glass preform is deformed as shown in, for example, FIG. 5. In FIG. 5, the glass preform not only has an effective portion A but a bent ineffective portion B, which is undesirable. This phenomenon is particularly conspicuous in the case where the porous preform is deposited around the quartz rod by outside vapor phase deposition method and is sintered.

SUMMARY OF THE INVENTION

Accordingly, an essential object of the present invention is to provide, with a view to eliminating the above mentioned disadvantages of conventional apparatuses, an apparatus for supporting, on a rotary shaft, an article to be heat treated in a heating furnace, e.g., glass preform without incurring run-out of the glass preform.

In order to accomplish this object of the present invention, there is provided an apparatus for suspending, from a quartz rotary shaft, a glass article to be heat treated in a heating furnace so as to support the glass article. The present invention comprises a slot for receiving a cylindrical projection formed at an upper end of the glass article, which has an elliptical cross section and is formed at a lower end of the rotary shaft and a pin hole for securing the glass article to the rotary shaft, which is formed on the rotary shaft along a minor axis of the slot. A clearance between a peripheral surface of the slot and that of the cylindrical projection along the minor axis of the slot is set to not more than 0.2 mm, while a clearance between the peripheral surface of the slot and that of the cylindrical projection along a major axis of the slot is set to not less than 0.4 mm.

The present invention also provides an apparatus for supporting a glass article comprising first and second dummy rods. A coupling member is provided for coupling a lower portion of the first dummy rod and an upper portion of the second dummy rod in a vertical direction. A first pin is provided for securing the first dummy rod to the coupling member, which extends through the first dummy rod and the coupling member at right angles to an axis of the first dummy rod, and a second pin is provided for securing the second dummy rod to the coupling member, which extends through the second dummy rod and the coupling member at right angles to an axis of the second dummy rod so as to orthogonally intersect with the first pin.

The present disclosure relates to subject matter contained in Japanese Patent Application Nos. 3-147,269 (filed Jun. 19, 1991), 3-312,245 (filed Nov. 27, 1991) and 4-130,675 (filed May 22, 1992), which is expressly incorporated herein by reference in its entirety.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention is set forth, it is to be noted that like parts are designated by like reference numerals throughout several views of the accompanying drawings.

DETAILED DESCRIPTION OF THE INVENTION

Figure 1:
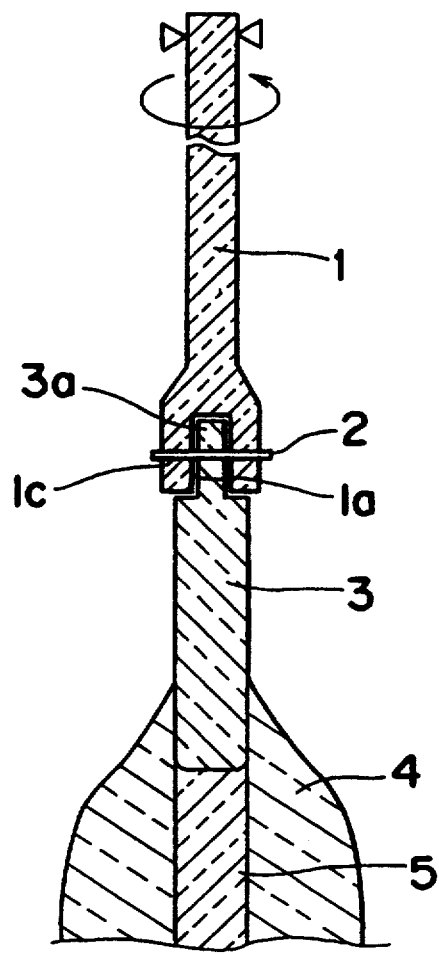
FIG. 1 is a schematic longitudinal sectional view of a connecting portion between a quartz bar and a rotary shaft in a prior art apparatus for supporting glass preform (already referred to)

The present inventors studied causes of run-out of glass preform in a known heating furnace. The study revealed that the known heating furnace has a structure shown in FIG. 1 in which a gravitational force of the glass preform prevents the glass preform from moving in an axial direction of a pin 2 for fixing a quartz bar 3 to a rotary shaft 1 but the glass preform is readily moved in a direction perpendicular to the axial direction of the pin 2 so as to be rotated about the pin 2. The quartz bar 3 and a quartz rod 5 attached to the quartz bar 3 acts as a starting member. Therefore, if clearance between a projection of the quartz bar 3 and a slot of the rotary shaft 1 is small, the projection strikes a peripheral surface of the slot repeatedly, thereby resulting in run-out of the glass preform.

Then, the present inventors examined run-out of the glass preform by changing clearance between the projection and the slot variously as shown in Table 1 below.

TABLE 1

Figure 6A:
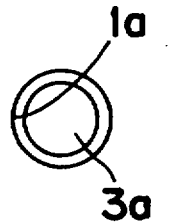
FIGS. 6a to 6d are Cross-sectional views showing clearance between a projection of the quartz bar and a slot of the rotary shaft in the apparatus of FIG. 2 and comparative examples.
Figure 6B:
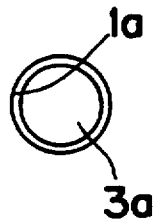
Figure 6C:
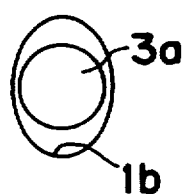
Figure 6D:
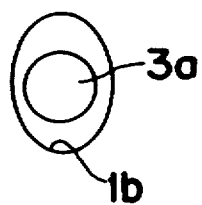

| Type | Dia. of projection (3a) (mm) | Clearance (mm) a | Clearance (mm) b | Cross section | Run-out |
|------|------|------|------|------|------|
| I | 18.0 | 0.25 | 0.25 | FIG. 6a | Run-out occurs with clattering sounds. |
| II | 18.0 | 0.1 | 0.1 | FIG. 6b | Run-out occurs more intensely with clattering sounds. |
| III | 18.0 | 0.2 | 0.4 | FIG. 6c | No run-out occurs. |
| IV | 14.0 | 2.2 | 2.4 | FIG. 6d | Large run-out occurs. |

Figure 3:
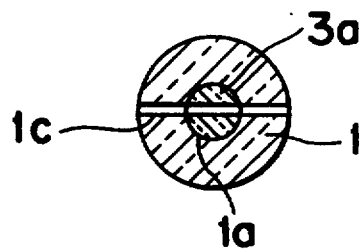
FIG. 3 is a cross-sectional view of the connecting portion of the prior art apparatus of FIG. 1 (already referred to)
Figure 4:
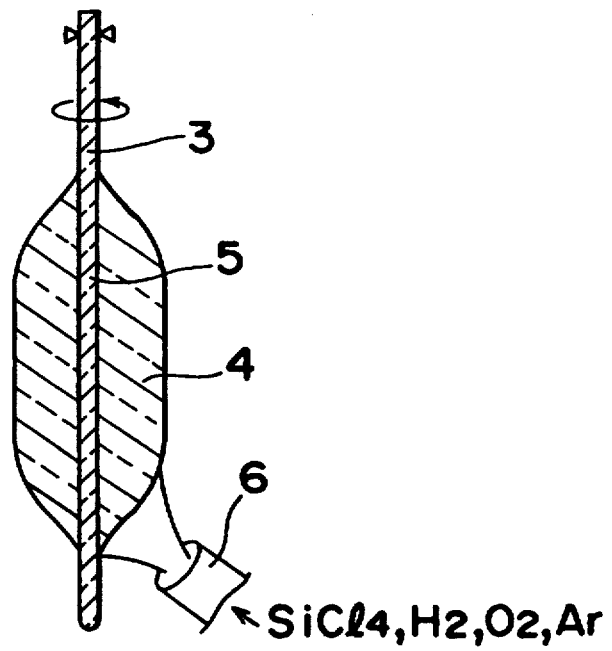
FIG. 4 is a schematic view explanatory of VAD method (already referred to)
Figure 5:
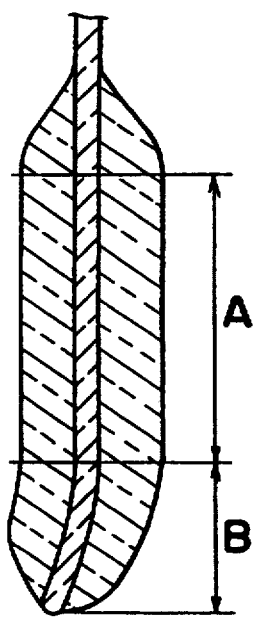
FIG. 5 is a view showing bending of the glass preform in the prior art apparatus of FIG. 1.

In Table 1 above, character a denotes an axial direction of the pin 2, while character b denotes a direction perpendicular to the axial direction of the pin 2. Initially, types I and II, in which a cylindrical projection 3a is fitted into a cylindrical slot 1a as shown in FIG. 3 are compared. In the type I having a clearance of 0.25 mm, run,out occurs with clattering sounds. Meanwhile, in the type II having a clearance of 0.1 mm, amount of run-out is larger than that of the type I.

Figure 2:
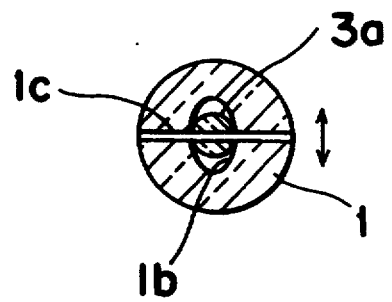
FIG. 2 is a cross-sectional view of a connecting portion between a quartz bar and a rotary shaft in an apparatus for supporting glass preform, according to a first embodiment of the present invention.

On the other hand, in the case where the cylindrical projection 3a is fitted into a slot 1b having an elliptical cross section and a pin hole 1c extends along a minor axis of the elliptical slot 1b as shown in FIG. 2, large run-out occurs in a type IV having a clearance of 2.2 mm in the axial direction of the pin 2 because it is difficult to fix the cylindrical projection 3a at the center of the elliptical slot 1b in the type IV. However, in a type III, in which a clearance in the axial direction of the pin 2 is set to 0.2 mm, and a clearance in the direction perpendicular to the axial direction of the pin 2 is set to 0.4 mm, the cylindrical projection can be fixed at the center of the elliptical slot 1b and no Obstacle is present in the direction perpendicular to the axial direction of the pin 2, so that substantially no run-out occurs.

Based on the above results, the present invention employs the cylindrical projection 3a and the elliptical slot 1b and sets clearances in the axial direction of the pin 2 and in the direction perpendicular to the axial direction of the pin 2 to not more than 0.2 mm and not less than 0.4 mm, respectively such that not only run-out of the glass preform at the time of its rotation is eliminated but bending of the sintered glass preform is prevented.

Therefore, in an apparatus for supporting a glass article, according to a first embodiment of the present invention, the single pin hole 1c is formed in the direction of the minor axis of the elliptical slot 1b so as to not only eliminate run-out of the glass preform but prevent bending of the glass preform. This is because if the clearance in the direction perpendicular to the axial direction of the pin hole is small in contrast with the present invention, the projection moves in the direction perpendicular to the axial direction of the pin hole during the rotation and comes into contact with the slot, thus resulting in run-out and bending of the glass preform.

Figure 7:
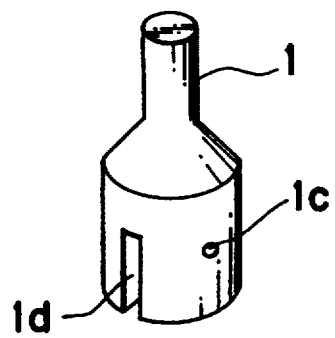
FIG. 7 is a perspective view of a rotary shaft employed in an apparatus according to a second embodiment of the present invention.
Figure 8:
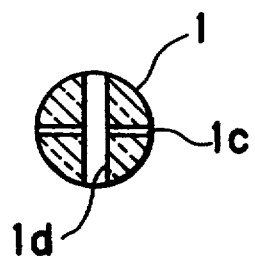
FIG. 8 is a cross-sectional view of the apparatus of FIG. 7.
Figure 9:
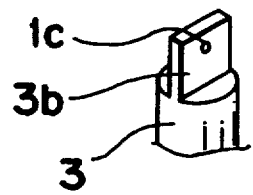
FIG. 9 is a perspective view of a platelike projection of a quartz bar which is one of the examples employed in the apparatus of FIG. 7.

FIGS. 7 to 9 show an apparatus for supporting a glass article, according to a second embodiment of the present invention. In FIGS. 7 and 8, an elongated slot 1d is formed on the bottom end of the rotary shaft 1 so as to open at opposite sides of the rotary shaft 1. Meanwhile, the quartz bar 3 is formed, on its top end, with the cylindrical projection 3a as shown in FIG. 2 or a platelike projection 3b as shown in FIG. 9. Furthermore, the pin hole 1c extends in a direction perpendicular to the longitudinal direction of the elongated slot 1d. By the above described arrangement of the apparatus, run-out of the glass preform can be eliminated in the same manner as in the apparatus of FIG. 2.

Hereinbelow, concrete examples of the apparatus of the present invention are described together with comparative examples.

EXAMPLE 1

This example 1 corresponds to the type III of Table 1. A quartz rod of 15 mm in diameter is attached to a lower end of a quartz starting member of 18.5 mm in diameter and a cylindrical projection of 18.0 mm in diameter is provided at an upper end of the starting member. Then, porous preform is deposited around the quartz rod to a thickness of 140 mm over a distance of 500 mm. The cylindrical projection of the starting member is fitted into an elliptical slot formed at a lower end of a quartz rotary shaft and then, the starting member is secured to the rotary shaft by a pin. The elliptical slot has a major diameter of 18.8 mm and a minor diameter of 18.4 mm. Then, the porous preform is inserted into a heating furnace heated to 1600° C. and is changed to transparent glass in atmosphere of 100% helium As a result, the sintered material is not subjected to bending at all and excellent preform can be obtained over a distance of 400 mm.

EXAMPLE 2

This example 2 corresponds to the apparatus of FIG. 7. A quartz rod of 15 mm in diameter is fixed to a lower end of a quartz starting member of 18.5 mm in diameter and a cylindrical projection of 18.0 mm in diameter is formed at an upper end of the starting member. Subsequently, porous preform is deposited around the quartz rod to a thickness of 140 mm over a distance of 500 mm. The cylindrical projection of the starting member is fitted into an elongated slot formed at a lower end of a quartz rotary shaft and then, the starting member is fixed to the rotary shaft by a pin. The elongated slot has a width of 18.2 mm.

Thereafter, when the porous preform is inserted into a heating furnace heated to 1600° C. and is changed to transparent glass in atmosphere of 100% helium, the sintered material is not bent at all and excellent preform can be obtained over a distance of 400 mm.

Comparative Example 1

This comparative example 1 corresponds to the type 1 of Table 1. A quartz rod of 15 mm in diameter is fixed to a lower end of a quartz starting member of 18.5 mm in diameter. A cylindrical projection of 18.0 mm in diameter is provided at an upper end of the starting member. Meanwhile, a circular slot of 18.5 mm in diameter is formed at a lower end of a quartz rotary shaft such that a clearance of 0.25 mm is defined between the cylindrical projection and the circular slot. After the cylindrical projection has been fitted into the circular slot, the starting member is secured to the rotary shaft by a pin. Subsequently, transparent glass is produced under the same conditions as those of the examples 1 and 2. As a result, bending of the sintered material is produced and thus, the bent portion of 50 mm in length is required to be discarded.

Comparative Example 2

This comparative example 2 corresponds to the type II of Table 1, in which clearance between the cylindrical projection and the circular slot is set to 0.1 mm in the above comparative example I. When the sintered material is produced in the same manner as in the comparative example 1, a lower portion of the sintered material, 90 mm in length should be discarded.

As is clear from the foregoing description, since run-out of the glass preform can be prevented by the above described arrangement of the apparatus of the present invention and thus, excellent sintered material free from bending can be obtained.

Figure 10:
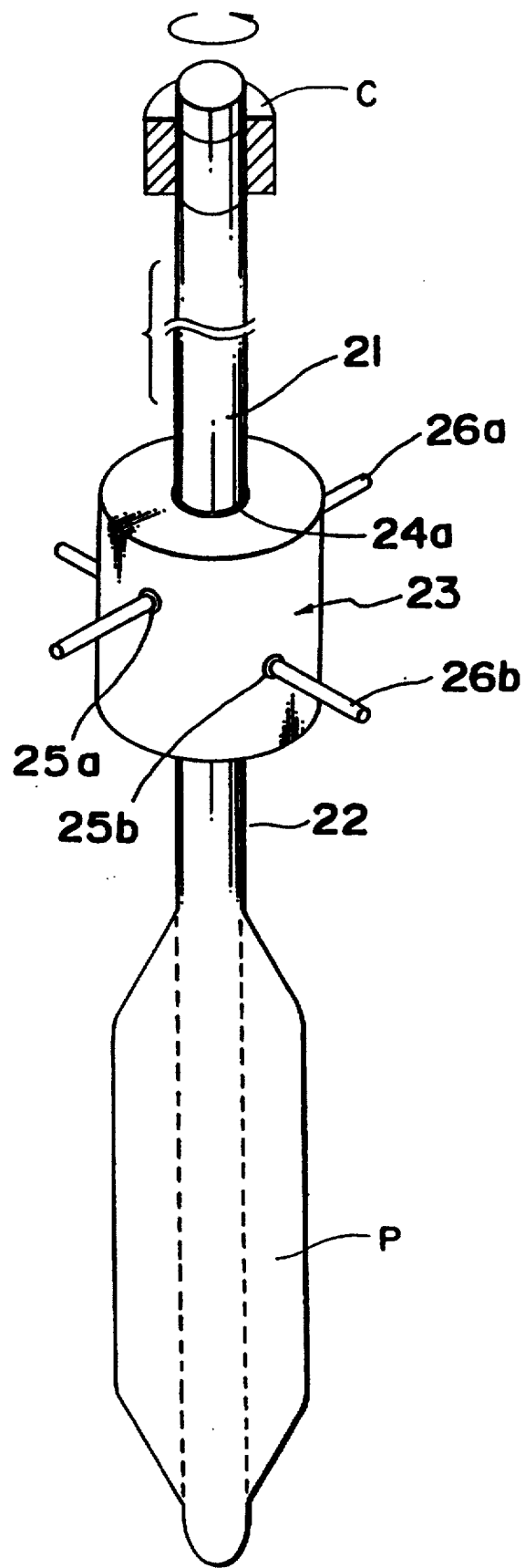
FIG. 10 is a perspective view of a rod coupling portion employed in an apparatus for supporting a glass article, according to a third embodiment of the present invention.
Figure 11:
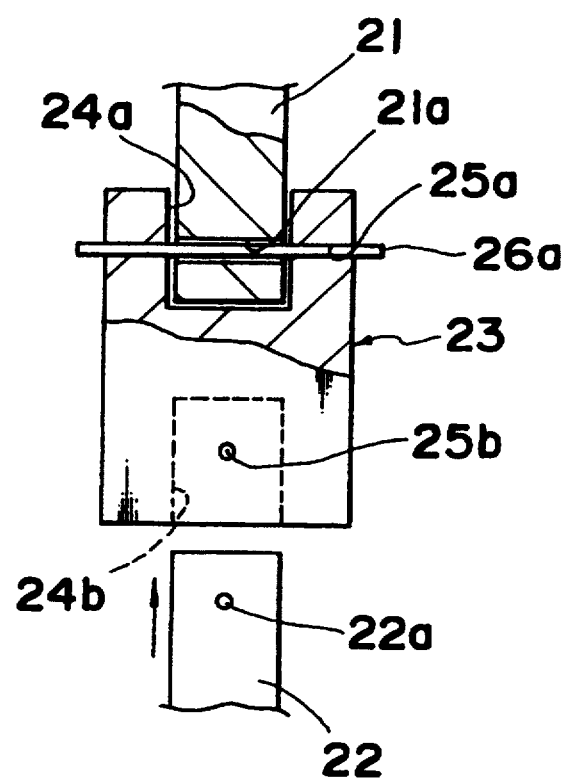
FIG. 11 is a partially sectional, side elevational view of the rod coupling portion of FIG. 10.

FIGS. 10 and 11 show a rod coupling portion employed in an apparatus for supporting a glass article, according to a third embodiment of the present invention. The rod coupling portion includes a first dummy rod 21, a second dummy rod 22 for supporting an optical fiber preform (P) and a coupling cylinder 23 for coupling the first and second dummy rods 21 and 22. The first dummy rod 21 is gripped in a vertical direction by a grip member, such as chuck C, and a pin hole 21a is formed at a lower end portion of the first dummy rod 21 so as to extend through and at right angles to an axis of the first dummy rod 21. Likewise, a pin hole 22a is formed at an upper end portion of the second dummy rod 22 so as to extend through and at right angles to an axis of the second dummy rod 22.

Meanwhile, bores 24a and 24b are, respectively, are formed on upper and lower faces of the coupling cylinder 23 so as to receive the first and second dummy rods 21 and 22. Pin holes 25a and 25b extend through and at right angles to an axis of the coupling cylinder 23 at the bores 24a and 24b, respectively so as to intersect with each other orthogonally.

Therefore, after the first dummy rod 21 has been inserted into the bore 24a, a first pin 26a is inserted through the pin hole 25a of the coupling cylinder 23 and the pin hole 21a of the first dummy rod 21 and thus, the first dummy rod 21 and the coupling cylinder 23 are secured to each other by the first pin 26a. Similarly, after the second dummy rod 22 has been inserted into the bore 24b, a second pin 26b is inserted through the pin hole 25b of the coupling cylinder 23 and the pin hole 22a of the second dummy rod 22, so that the second dummy rod 22 and the coupling cylinder 23 are secured to each other by the second pin 26b. Since the pin holes 25a and 25b intersect with each other orthogonally as described above, the first and second pins 26a and 26b also intersect with each other orthogonally. As a result, the first and second dummy rods 21 and 22 are securely coupled with each other in alignment with each other through the coupling cylinder 23 by the first and second pins 26a and 26b intersecting with each other orthogonally.

Therefore, since the coupling cylinder 23 is used for coupling the first and second dummy rods 21 and 22, the first and second dummy rods 21 and 22 can be coupled with each other easily and an inconvenience such as associated with conventional apparatuses is eliminated that the dummy rods as a whole should be replaced with new ones.

Meanwhile, since the first and second dummy rods 21 and 22 are securely coupled with each other by using the first and second pins 26a and 26b, intersecting with each other orthogonally, eccentricity between the first and second dummy rods 21 and 22 and bending or warpage of a preform can be eliminated.

From a standpoint of durability, it is preferable, as noted below, that the coupling cylinder 23 is made of quartz, silicon carbide, alumina, zirconium oxide, etc. In case the coupling cylinder 23 is made of high-purity quartz, the coupling cylinder 23 can be used at a maximum temperature of about 1200° C. When the coupling cylinder 23 is made of high-purity carbon and oxygen concentration is as low as 1000 ppm or less, the coupling cylinder 23 can be used at temperatures ranging from 1500° to 2000° C. Meanwhile, if silicon carbide is coated on a surface of the coupling cylinder 23 made of carbon, etc. or the coupling cylinder 23 is formed by machining a block of silicon carbide and oxygen and halogen concentrations are as low as several % or less, the coupling cylinder 23 can be used in the vicinity of 1500° C.

Meanwhile, the first and second pins 26a and 26b and the first and second dummy rods 21 and 22 may be made of the same materials as described above.

The rod coupling portion of the present invention is suitable for application to product ion of optical fiber preforms such as a fiber drawing process, a dehydrating and sintering process, a sooting process, etc.

Figure 12:
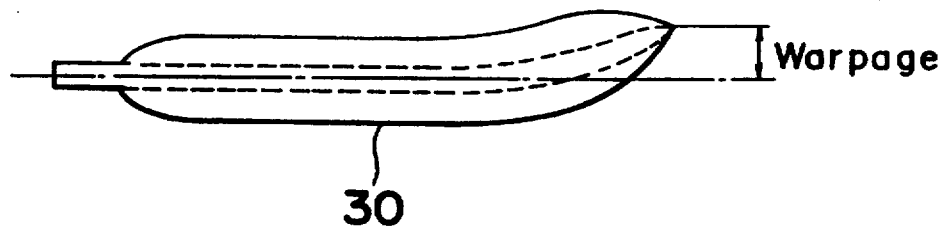
FIG. 12 is a view showing a sintered preform obtained by the apparatus of FIG. 10.

Results of measurement of warpage of a sintered preform obtained by the rod coupling portion of FIG. 10 used for dehydration and sintering for one month are as follows. The optical fiber preform employed has a diameter of 160 mm and a length of 1500 mm in a state of a soot-jacketed member and a diameter of 75 mm and a length of 1320 mm after sintering. FIG. 12 shows a sintered preform 30 obtained by the rod coupling portion of FIG. 10. The sintered preform 30 has a warpage of not more than 1 mm even after use of the rod coupling portion for three months.

On the other hand, when a sintered preform is obtained by using a known rod coupling portion in comparison with that of the rod coupling portion of the present invention, the sintered preform has a warpage of 5 mm or more after use of the rod coupling portion for one month, thereby resulting in such an inconvenience that the sintered preform is brought into contact with a muffle of a fiber drawing furnace.

Figure 13A:
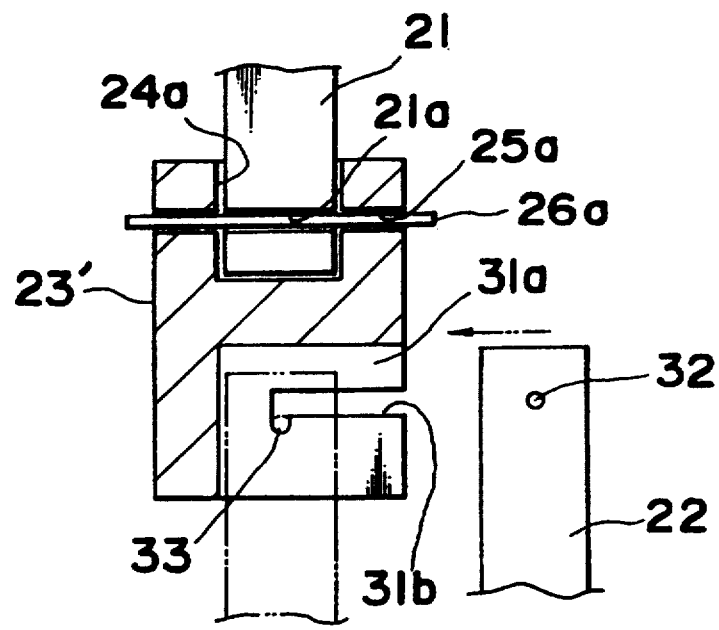
FIGS. 13a and 13b are a sectional view and an elevational view showing a modification of the rod coupling portion of FIG. 10, respectively.
Figure 13B:
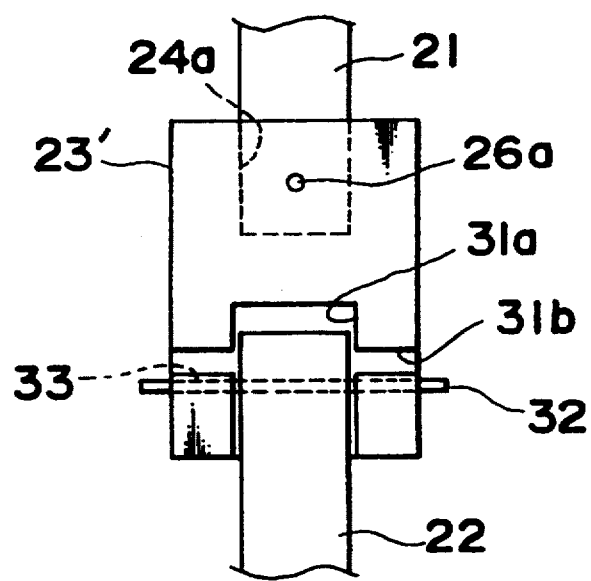

FIGS. 13a and 13b show a modification of a rod coupling portion of FIG. 10. The modified rod coupling portion includes a coupling cylinder 23'. The coupling cylinder 23' has a slot 31a for receiving an upper end portion of the second dummy rod 22, a slit 31b for receiving a second pin 32 and a recess 33 engageable with the second pin 32. The second pin 32 is driven into the upper end portion of the second dummy rod 22 at right angles to the axis of the second dummy rod 22 so as to be inserted into the slit 31b. Furthermore, thee recess 33 is formed in the slit 31b so as to be engaged with the second pin 32 such that the second pin 32 intersects with the first pin 26a orthogonally and at right angles to the axis of the second dummy rod 22. Since other constructions of the modified rod coupling portion are similar to those of the rod coupling portion of FIG. 10, the description is abbreviated for the sake of brevity.

In the modified rod coupling portion of the above described arrangement, when the second dummy rod 22 is secured to the coupling cylinder 23', not only the axis of the coupling cylinder 23' coincides with the axis of the second dummy rod 22 but the first and second pins 26a and 32 intersect with each other orthogonally.

Figure 14:
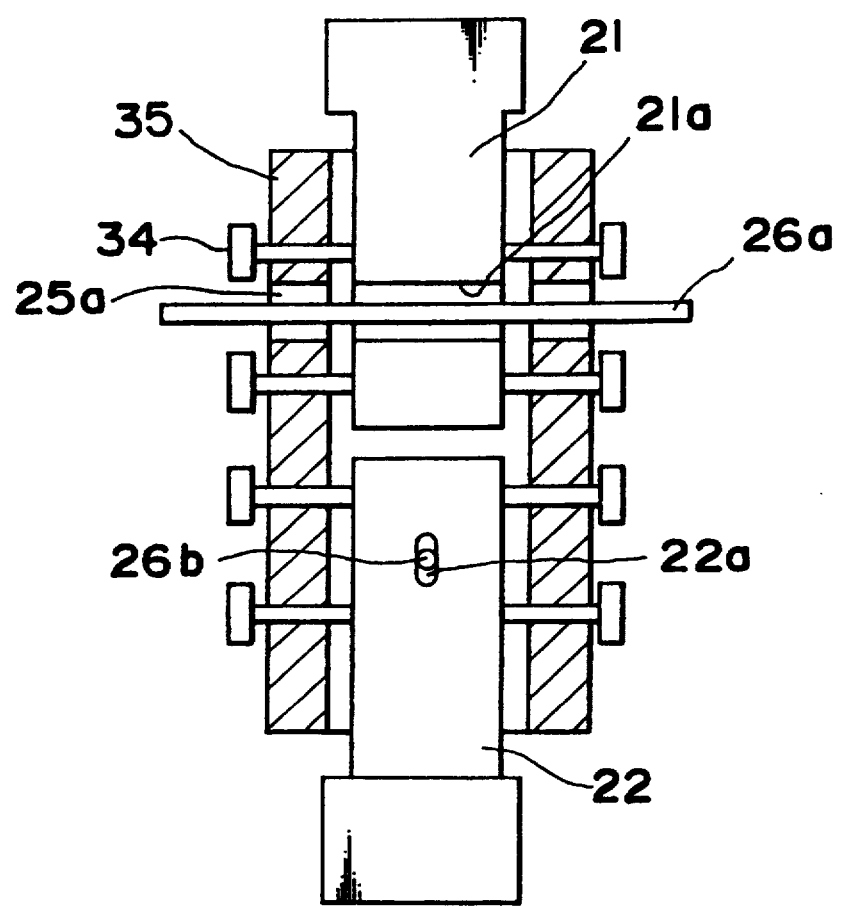
FIG. 14 is a sectional view of a rod coupling portion employed in an apparatus for supporting a glass article, according to a fourth embodiment of the present invention.

FIG. 14 shows a rod coupling portion employed in an apparatus for supporting a glass article, according to a fourth embodiment of the present invention. In FIG. 14, the rod coupling portion includes a coupling cylinder 35 and a plurality of screws 34 for securing the first and second dummy rods 21 and 22 to the coupling cylinder 35. Furthermore, in this embodiment, the pin holes 21a and 22a of the first and second dummy rods 21 and 22 and the pin holes 25a and 25b of the coupling cylinder 35 are formed into an elliptical shape so as to facilitate insertion of the pins 26a and 26b into the pin holes 25a and 21a and the pin holes 25b and 22a. Furthermore, since the first and second dummy rods 21 and 22 are secured to the coupling cylinder 35 by using the screws 34 made of carbon, an undesirable phenomenon, such that the preform is deflected by gas flow or the like during, for example, fiber drawing in the fiber drawing furnace, so as to be brought into contact with the muffle, is obviated.

As compared with the arrangement of FIG. 10 in which the second dummy rod 22 for supporting the optical fiber preform is integrally coupled with the coupling cylinder 23, vibrations at the rod coupling portion of FIG. 14 are absorbed and thus, fiber drawing can be performed stably.

As described above, the rod coupling portion of the present invention can be applied not only to drawing of the preform but to dehydration and sintering of the preform. When the first dummy rod gripped by the grip member and the second dummy rod for supporting the preform are coupled with each other, the coupling cylinder is used and the first and second dummy rods are retained by the first and second pins intersecting with each other orthogonally, so that the first and second dummy rods are hung vertically by weight of the preform. As a result, eccentricity between the first and second dummy rods and bending or warpage of the preform can be prevented.

As will be seen from the foregoing description of the rod coupling portion of the present invention, the first and second dummy rods are fixedly coupled with each other by using the coupling cylinder and the first and second pins intersecting with each other orthogonally. Therefore, even if fitting of the pins into the pin holes becomes loose after use of the rod coupling portion for a long period, only the coupling cylinder is required to be replaced with a new one without the need for replacing the dummy rods as a whole, in contrast with prior art rod coupling portions, thereby resulting in reduction of production cost of the rod coupling portion.

What is claimed is:

1. In an apparatus for suspending from a quartz rotary shaft, a glass article to be heat treated in a heating furnace so as to support the glass article, comprising:

a slot for receiving a cylindrical projection formed at an upper end of the glass article, which has an elliptical cross section and is formed at a lower end of the rotary shaft; and a pin hole, for receiving a pin for securing the glass article to the rotary shaft, which is formed on the rotary shaft along a minor axis of the slot;

wherein a clearance between a peripheral surface of the slot and that of the cylindrical projection along the minor axis of the slot is set to not more than 0.2 mm, while a clearance between a peripheral surface of the slot and that of the cylindrical projection along a major axis of the slot is set to not less than 0.4 mm.

2. A combination of a supporting apparatus and a article, comprising a glass article;

a first dummy rod which is gripped in a vertical direction by a grip member;

a second dummy rod for supporting said glass article;

a coupling member for coupling a lower portion of said first dummy rod and an upper portion of said second dummy rod in the vertical direction;

a first pin for securing said first dummy rod to said coupling member, which extends through said first dummy rod and said coupling member at right angles to an axis of said first dummy rod; and a second pin, extending orthogonally to said first pin for securing said second dummy rod to said coupling member, which extends through said second dummy rod and said coupling member at right angles to an axis of said second dummy rod.

3. The combination as claimed in claim 2, wherein first and second openings are, respectively, formed on upper and lower end faces of said coupling member such that said first and second dummy rods are axially inserted into said first and second openings, respectively.

4. The combination as claimed in claim 3, wherein said second opening is formed by a slot and said coupling member has a slit for receiving said second pin and a recess engageable with said second pin.

5. The combination according to claim 2, wherein said coupling member comprises a single, integrally formed cylinder having first and second pin holes extending diametrically therethrough, wherein said first and second pin holes extend in directions which are perpendicular to one another.

6. The combination according to claim 2, wherein said coupling member is formed of a durable material selected from the group consisting of quartz, silicon carbide, alumina, and zirconium oxide.

7. The combination according to claim 2, wherein said first and second pins are formed of a durable material selected from the group consisting of quartz, silicon carbide, alumina, and zirconium oxide.

8. The combination according to claim 2, wherein said first and second dummy rods are formed of a durable material selected from the group consisting of quartz, silicon carbide, alumina, and zirconium oxide.

* * * * *

UNITED STATES PATENT AND TRADEMARK OFFICE
CERTIFICATE OF CORRECTION

PATENT NO. : 5,417,399
DATED : May 23, 1995
INVENTOR(S) : T. SAITO et al.

It is certified that error appears in the above-indentified patent and that said Letters Patent is hereby corrected as shown below:

At column 8, line 40 (claim 2, line 2), change "article, comprising" to ---glass article, comprising:---.

Signed and Sealed this

Twenty-ninth Day of October 1996

Attest:

BRUCE LEHMAN

*Attesting Officer*  *Commissioner of Patents and Trademarks*